Aug. 23, 1938.  L. A. WHITTIER  2,127,546
RELIEF MAP
Filed May 28, 1935   3 Sheets-Sheet 1
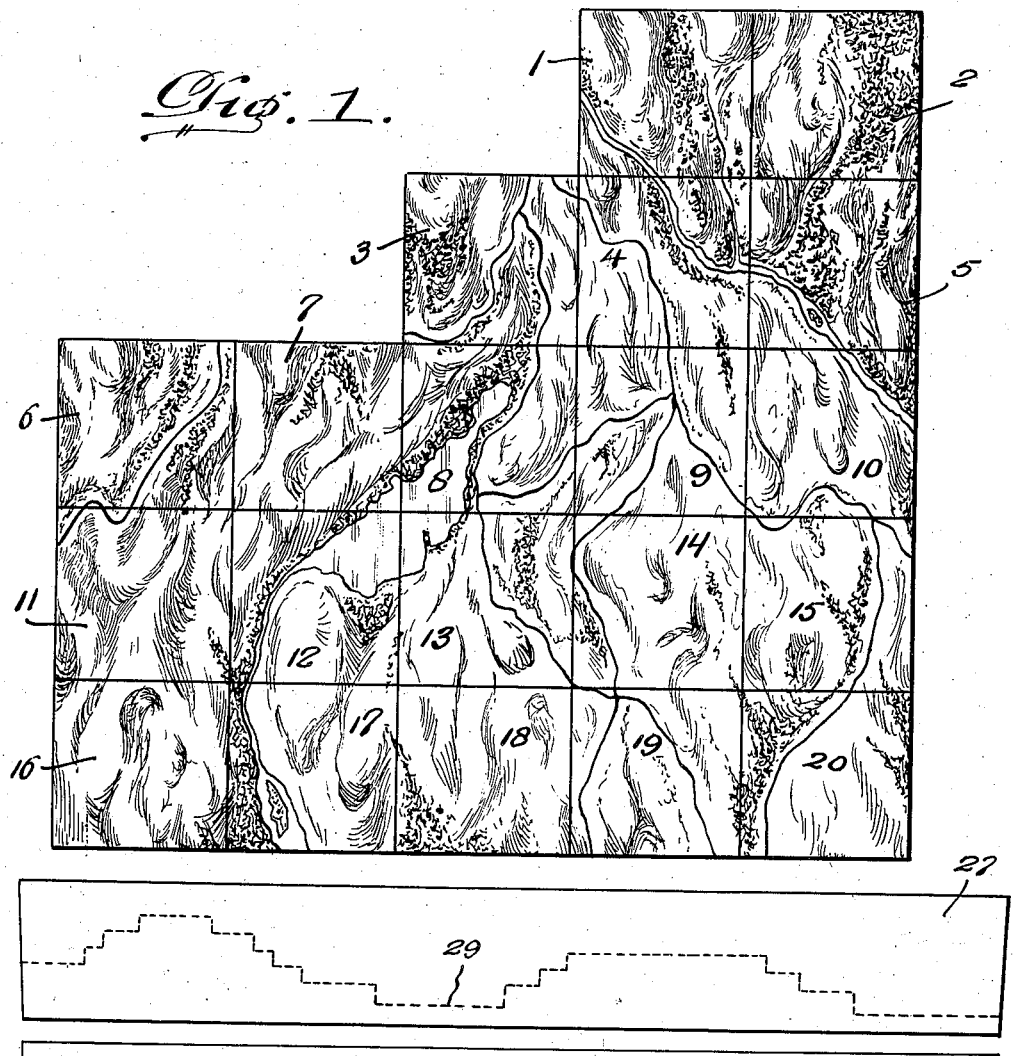
Fig. 1.
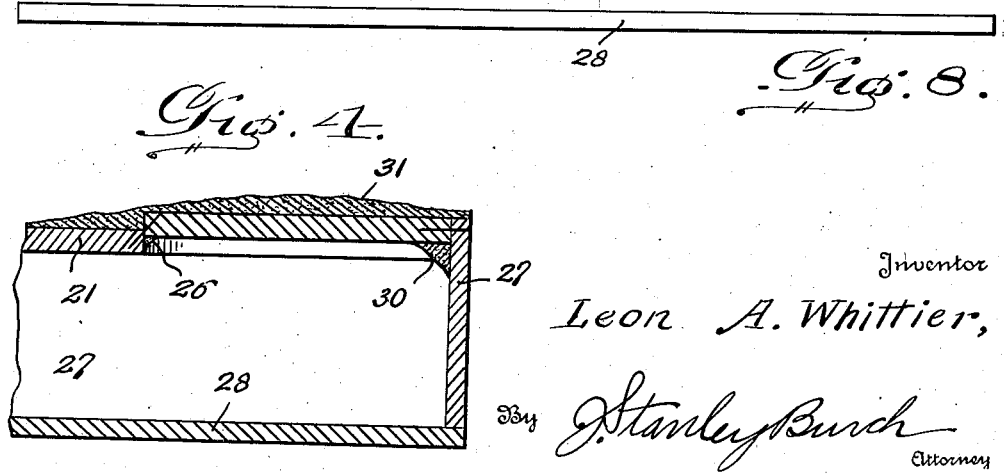
Fig. 8.
Fig. 4.
Inventor
Leon A. Whittier,
By J. Stanley Burch
Attorney Aug. 23, 1938.        L. A. WHITTIER         2,127,546
                      RELIEF MAP
               Filed May 28, 1935      3 Sheets-Sheet 2

Inventor
Leon A. Whittier
By Stanley Burch
Attorney

Inventor.
Leon A. Whittier,
By J. Stanley Burch
Attorney

Patented Aug. 23, 1938

2,127,546

UNITED STATES PATENT OFFICE

2,127,546

RELIEF MAP

Leon A. Whittier, Santa Barbara, Calif.

Application May 28, 1935, Serial No. 23,915

3 Claims. (Cl. 35—41)

This invention relates generally to improvements in relief maps designed especially for use in instructing or drilling the student in the art of military maneuvering, tactics, and strategy.

More particularly, the present invention contemplates the provision of an improved relief map of the above kind composed of a plurality of sections which can be packed together within a small space for convenient storage or transportation, said sections being so constructed that the surfaces thereof accurately simulate and depict the ground formations and other topography of a given terrain.

An important object of the present invention is to provide an improved relief map of the above kind, whose sections are simple and durable in construction, light in weight for convenient handling, and inexpensive to manufacture.

A further object is to provide an improved sectional relief map and method of constructing the same, wherein the map sections embody contour or surface shells so constructed as to accurately simulate the ground formations of a selected terrain.

With the above general objects in view, and others that will become apparent as the nature of the invention is better understood, such invention consists in the novel form, combination and arrangement of parts hereinafter more fully described, shown in the accompanying drawings and claimed.

In the drawings:

Figure 1 is a plan view of a map constructed in accordance with the present invention, the sections of the map being grouped in proper relation to reveal the topography of the terrain represented by the map.

Figure 4 is a fragmentary vertical transverse section on line 4—4 of Figure 2.

Figure 2:
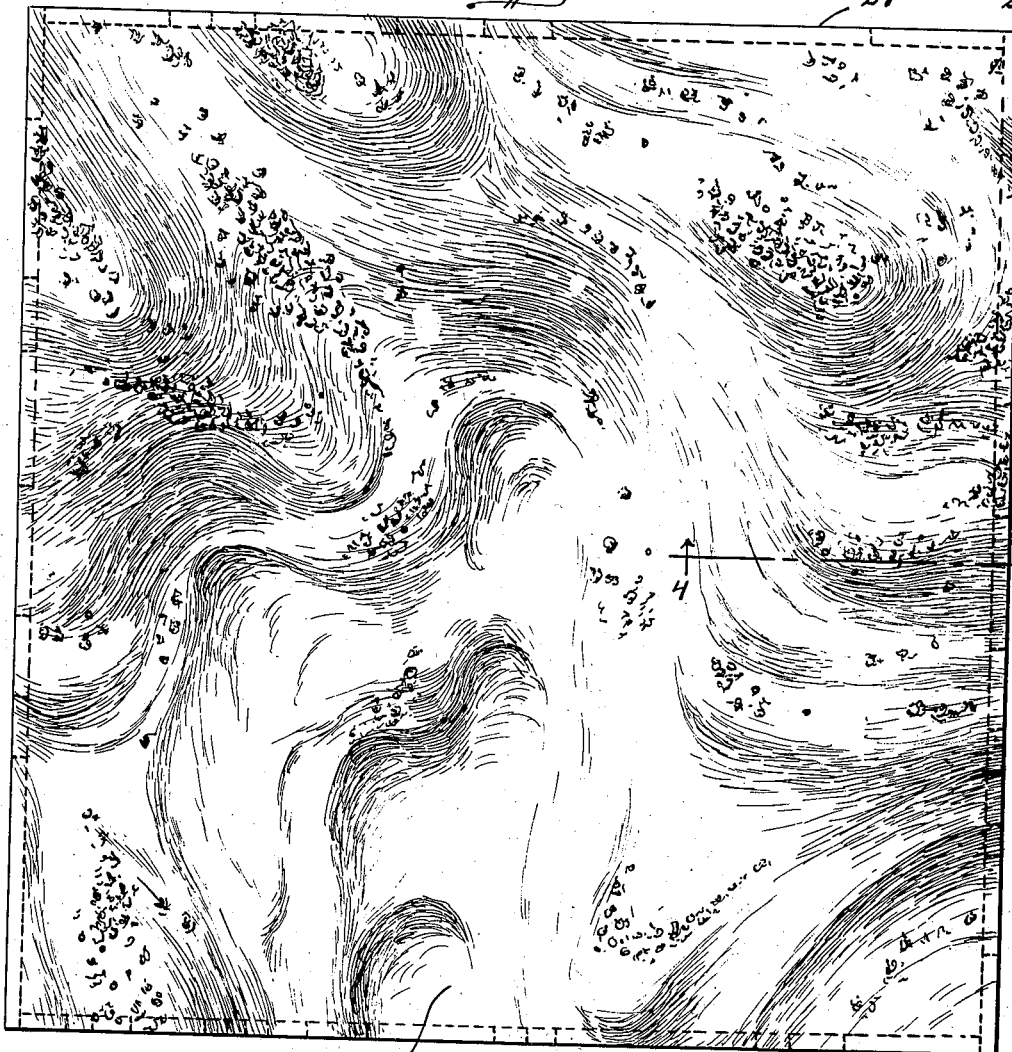
Figure 2 is an enlarged plan view of one of the sections of the map shown in Figure 1.
Figure 3:
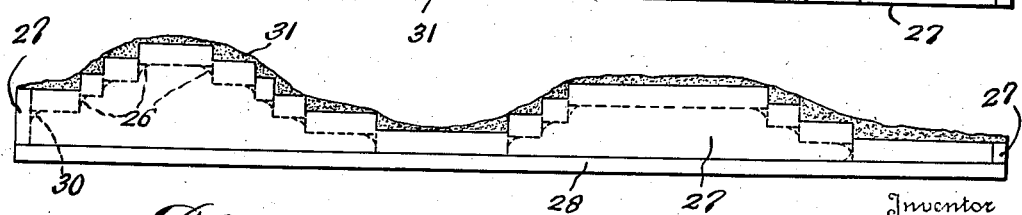
Figure 3 is an elevational view of the map section shown in Figure 2, looking toward the side of the section which is lowermost in said Figure 2.
Figure 5:
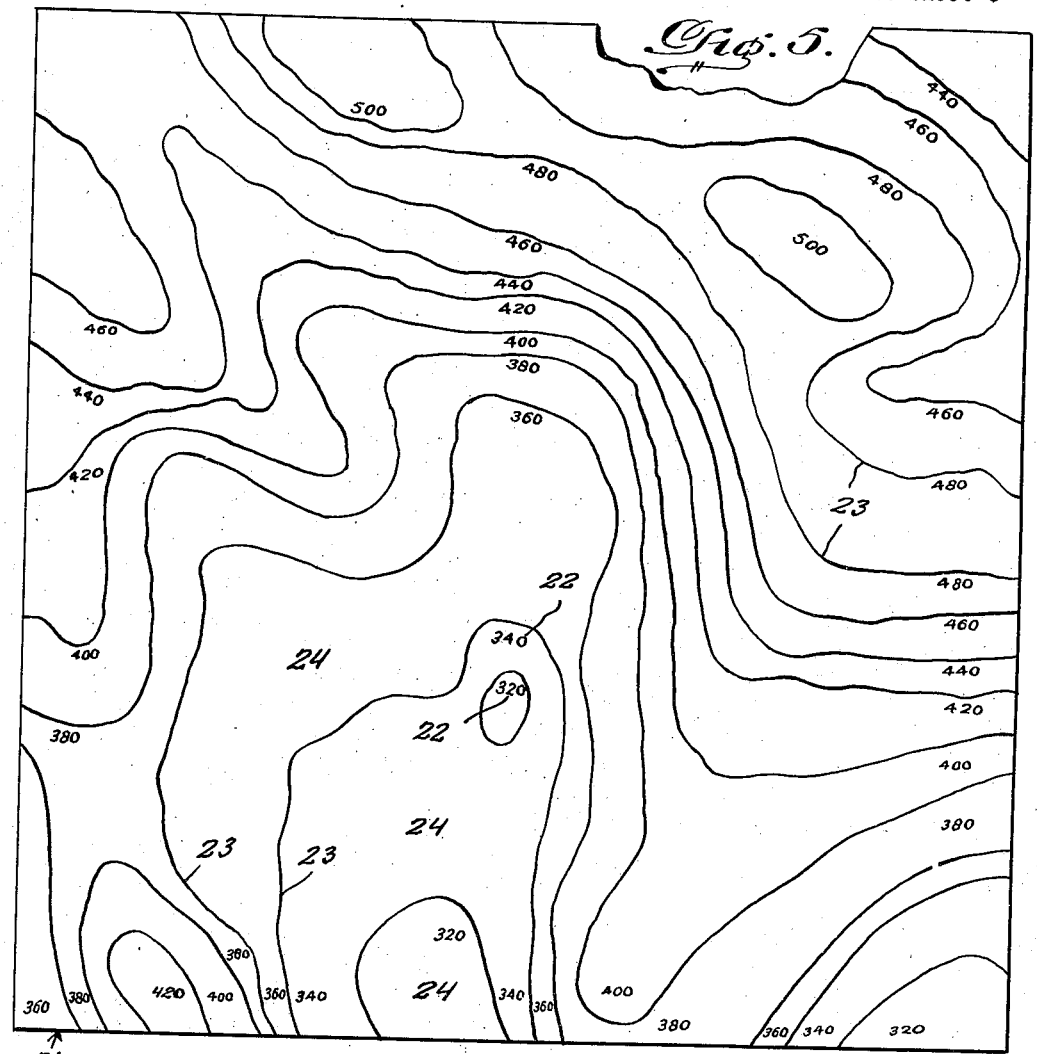
Figure 5 is a plan view of the sheet employed in the production of the contour or surface shell of the map section shown in Figures 2 and 3, and illustrating certain steps in the method of such production.
Figure 6:
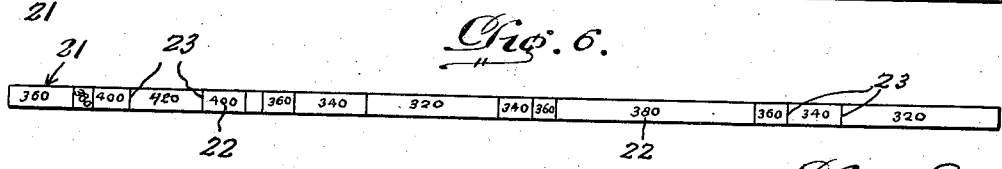
Figure 6 is an edge elevational view of the sheet shown in Figure 5, looking at the edge which is lowermost in the latter figure.
Figure 7:
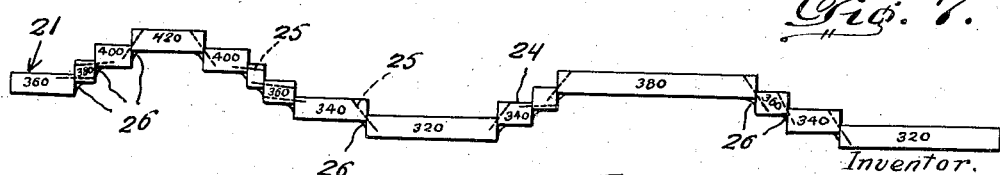

Figure 7 is a view somewhat similar to Figure 6 with the contour pieces of the sheet shown in Figures 5 and 6 relatively shifted to different proper and indicated elevations and secured in such relatively shifted positions to form the base or foundation of the contour or surface shell of the map section; and Figure 8 is an elevational view of the tray from which is formed the supporting base for the contour or surface shell of the map section shown in Figures 2 and 3, the bottom wall of said tray being removed, and the visible side of the tray being marked by dotted lines to indicate the manner in which said side is cut to give its upper edge a profile corresponding to the stepped relation of the contour sections of the contour sheet shown in Figures 5, 6 and 7.

Referring more in detail to the drawings, the present improved map may be composed of any number of sections, depending upon the shape and size of the terrain to be depicted, there being twenty of such sections illustrated and consecutively numbered from 1 to 20 in Figure 1. The map sections may be formed for use in depicting or representing any given area or terrain.

In constructing a relief map in accordance with the present invention, I first enlarge each square of an ordinary paper topographical map to a desired size for each 1000 yards of area or terrain, using the cross section, projection, or other method of enlarging. The contours are then numbered in each square of the enlarged map whereupon each square of the enlarged map is transferred, such as by the use of carbon paper, to the surface of a sheet of suitable material, such as one-half inch "Red Top" insulation board manufactured by the U. S. Gypsum Company. The sheet of insulation board or other suitable material used in making the contour or surface shell of the map section shown in Figures 2 and 3 is indicated at 21 in Figures 4 to 7 inclusive, and in Figure 5 it will be seen where the numbered contour lines of the square of the enlarged map have been transferred to the surface of this sheet, the elevation indicating numbers of these contour lines being indicated at 22. The next step is to cut through the sheet 21 along the contour lines as at 23, by means of a suitable tool, thereby completely separating the contour portions of the sheet 21 to produce the contour pieces 24. The contour lines and their numbers are preferably extended onto the edges of the sheet 21 as indicated in Figures 6 and 7. The contour pieces 24 are relatively displaced vertically to different elevations as shown in Figure 7, and to degrees corresponding to the elevations marked on such contour pieces, so that the ultimate contour or surface shell will accurately simulate the ground formations or contours of the area represented. The contour pieces thus relatively displaced are then fixed in their relatively displaced positions by any suitable means, such as pins 25 driven through adjoining edges of the contour pieces, and glue flowed into the corners at the contacting edges of the contour pieces as at 26. A very strong and durable, as well as accurately formed contour shell is thus produced, adapted to be surfaced and mounted in a supporting base as and in a manner to be presently described.

As above noted, the contour shell of each map section is mounted in a supporting base, and such supporting base is preferably formed from a tray made of suitable wood ply board and composed of a rectangular body 27 and a bottom wall 28. The sides of the tray are necessarily made at least as high as the highest contour piece of the contour shell to be used with the tray in the production of a given map section. From the extremes of elevation of the contour shell and the vertical intervals between the contour pieces of said shell, I construct a scale to be used in marking the position of each contour piece on the sides of the tray. To mark the contour positions on the sides of the tray, I may tack the enlarged map square on the top edges of the tray and transfer the contour lines by means of carbon paper to the edges of the tray side, marking the contour numbers under each line, and then drawing lines by the use of a square down the sides of the tray from the contour lines. With the scale mentioned above, I mark the position of the contour of these lines, subsequently drawing the profile on each side of the tray by the use of a rule or straight edge, as indicated at 29 in Figure 8. The sides of the tray are then cut along the contour profile line by means of a hack saw or the like so that the upper edges of the sides of the tray are given the same stepped formation or profile as the corresponding edges of the contour shell, as illustrated clearly in Figure 3. The contour shell is then placed in the top of the supporting base thus produced, with the upper surfaces of the contour pieces of the contour shell flush with the corresponding upper edge portions of the sides of the supporting base. The contour shell may be temporarily held in proper position within the top of the supporting base by any suitable means, after which it is permanently fixed in such position by driving nails through the sides of the supporting base into the edges of the contour shell. With the bottom wall of the supporting base removed as illustrated in Figure 8, the assembled side walls of the supporting base and the contour shell are inverted, whereupon plaster or the like is flowed in the corners where the edges of the contour shell and the sides of the supporting base meet, as at 30. The latter operation effectively connects the contour shell and the sides of the supporting base, sealing and fixing the contour shell in position and filling in any small spaces which may occur between the edges of the contour shell and the sides of the supporting base. After this plaster has hardened, the bottom wall of the supporting base is fastened in place by means of glue and nails or screws.

The next step is to surface the contour shells of the map sections, and for this purpose all of the map sections are grouped or assembled in proper relation. A surface coating of slow setting plaster is then applied to the upper surfaces of the contour shells of all of the map sections, as indicated at 31, slow setting plaster being preferably used so as to afford sufficient time to properly shape the surface of the map sections. Also, before applying the plaster to the contour shells, they should be given a generous coating of shellac whereby the plaster will adhere permanently and uniformly. Also, when the map sections are grouped or assembled for surfacing, they are preferably separated a slight distance by the use of thin boards or other suitable separators therebetween. This permits the plaster to be flowed over the upper edges of the supporting bases of the map sections from one section to another, and subsequent separation of the map sections by cutting through the surface plaster with a fine saw at the points where the separator boards are used between the map sections. After the plaster surface 31 has thoroughly hardened, it is coated with shellac to render the same durable and resistant to penetration by moisture. Differently colored pieces of felt may be used on the surfaces of the map sections to represent the several branches of military service, and different symbols may also be used to denote different military units in all formations. These felt pieces and symbols may be segregated in a compartment tray ready for use, and into which they may be re-sorted after use. Also, colored yarns, colored tacks, cloth covered wire, small celluloid flag pins, felt cutouts, dull finished celluloid tacks, etc., may be employed to indicate various elements and facilitate illustration of various military maneuvering, tactics and strategy, and to simulate various topographical features. In this connection, colored chalk may also be used on the surface of the map as the latter is such that the chalk may be readily erased.

In use, the map may be assembled on a level floor or table, or on an angle against a wall, with sufficient room for the gathering of a class of students about the map on all sides of the latter. The assembly on a level floor is most desirable for it will require fewer tacks and will preserve the surface of the map. As shown more clearly in Figure 8, the tray from which the supporting base of each map section is formed preferably tapers smaller downwardly so as to produce closer joints between the map sections at the tops of the latter when the map is assembled on a floor or table having an uneven surface.

From the foregoing description, it is believed that the construction, manner of use, and advantages of the present invention will be readily understood and appreciated by those skilled in the art. Also, it will be apparent that the details of construction and specific arrangements of parts illustrated and described may be varied without departing from the spirit of the invention as claimed.

What I claim as new is:

1. The herein described method of constructing a relief map which consists in transferring the contour lines of an ordinary topographical map to the upper surface of a single sheet of insulating board or like relatively thick and stiff material, providing elevation indicating numbers on said sheet adjacent said transferred contour lines, dividing said sheet into separate contour pieces by cutting entirely through the sheet along said contour lines, relatively displacing said separate contour pieces vertically a distance less than the thickness thereof to position said contour pieces in stepped relation and at different elevations corresponding to the elevation indicating numbers thereon, securing said contour pieces together in such relatively displaced stepped relation to provide a contour shell, providing a tray-like supporting base having side walls whose upper edges are of stepped profiles corresponding to the profiles of the respective edges of such contour shell, securing said contour shell within the upper portion of said supporting base, and applying a plastic surface covering to said contour shell and the upper edges of the side walls of said supporting base to fill in the stepped portions of the same and accurately simulate the ground formations of the represented area.

2. The herein described method of constructing a relief map, consisting in transferring to the surfaces of sheets of insulating board or like relatively thick and stiff material the contour lines in the respective squares of an enlarged topographical map, dividing each sheet into separate contour pieces by cutting entirely through the sheet along the contour lines thereof, relatively displacing said separate contour pieces vertically a distance less than the thickness thereof to position said contour pieces in stepped relation to and at different elevations corresponding to the elevations indicated on the corresponding squares of the topographical map, securing said contour pieces of each sheet in their relatively displaced stepped relation to provide a contour shell, providing for each contour shell a tray-like supporting base the upper edges of whose side walls have stepped profiles corresponding to the profiles of the edges of the corresponding contour shell, mounting said contour shells in the upper portions of their supporting bases to provide unfinished map sections, grouping said unfinished map sections in proper relation, and then applying to the upper surfaces of the contour shells and the upper edges of the supporting bases of all of the grouped unfinished map sections a plastic surface coating shaped to fill in the stepped portions of said shells and said edges of the supporting bases so as to correspond to the surface shape of the area simulated.

3. The herein described method of constructing a relief sectional map, consisting in transferring to the surfaces of sheets of insulating board or like relatively thick and stiff material the contour lines in the respective squares of an enlarged topographical map, dividing each sheet into separate contour pieces by cutting entirely through the sheet along the contour lines thereof, relatively displacing said separate contour pieces vertically a distance less than the thickness thereof to position said contour pieces in stepped relation to and at different elevations corresponding to the elevations indicated on the corresponding squares of the topographical map, securing said contour pieces of each sheet in their relatively displaced stepped relation to provide a contour shell, providing for each contour shell a tray-like supporting base the upper edges of whose side walls have stepped profiles corresponding to the profiles of the edges of the corresponding contour shell, mounting said contour shells in the upper portions of their supporting bases to provide unfinished map sections, grouping said unfinished map sections in proper relation, providing temporary spacers between said grouped unfinished map sections, then applying to the upper surfaces of the contour shells and the upper edges of the supporting bases of all of the grouped unfinished map sections a plastic surface coating shaped to fill in the stepped portions of said shells and said edges of the supporting bases so as to correspond to the surface shape of the area simulated, and finally separating the map sections by cutting through the surface coating at points coincident with the spacers between said map sections.

LEON A. WHITTIER.